(12) United States Patent
Scott et al.

(10) Patent No.: US 10,567,369 B2
(45) Date of Patent: Feb. 18, 2020

(54) SECURE TOKEN PASSING VIA HASH CHAINS

(71) Applicant: INTUIT INC., Mountain View, CA (US)

(72) Inventors: Glenn Scott, Mountain View, CA (US); Induprakas Keri, Menlo Park, CA (US)

(73) Assignee: INTUIT INC., Mountain View, CA (US)

( * ) Notice: Subject to any disclaimer, the term of this patent is extended or adjusted under 35 U.S.C. 154(b) by 301 days.

(21) Appl. No.: 15/645,823

(22) Filed: Jul. 10, 2017

(65) Prior Publication Data
US 2019/0014100 A1  Jan. 10, 2019

(51) Int. Cl.
*H04L 29/06* (2006.01)
*H04L 9/32* (2006.01)

(52) U.S. Cl.
CPC ........ *H04L 63/0807* (2013.01); *H04L 9/3236* (2013.01); *H04L 9/3242* (2013.01); *H04L 63/20* (2013.01); *H04L 2209/38* (2013.01); *H04L 2209/56* (2013.01)

(58) Field of Classification Search
CPC .... H04L 63/0807; H04L 63/20; H04L 9/3242
USPC ....................................................... 713/150
See application file for complete search history.

(56) References Cited

U.S. PATENT DOCUMENTS

| | | | | |
|---|---|---|---|---|
| 9,292,707 B1* | 3/2016 | Fontecchio | ......... | H04L 63/0876 |
| 9,407,631 B1* | 8/2016 | Triandopoulos | .... | H04L 63/0838 |
| 9,432,360 B1* | 8/2016 | Triandopoulos | .... | H04L 63/0838 |
| 2015/0120567 A1* | 4/2015 | Van Rooyen | ...... | G06Q 20/3829 705/59 |
| 2016/0142409 A1* | 5/2016 | Frei | ..................... | H04L 63/0884 713/176 |
| 2017/0048235 A1* | 2/2017 | Lohe | .................... | G06Q 20/065 |
| 2018/0114220 A1* | 4/2018 | Ekberg | ............... | G06Q 20/3829 |
| 2018/0219857 A1* | 8/2018 | Bhattacharya | ...... | H04L 63/0823 |
| 2019/0036906 A1* | 1/2019 | Biyani | ................ | H04L 63/0807 |

(Continued)

FOREIGN PATENT DOCUMENTS

| WO | 2017004527 A1 | 1/2017 |
|---|---|---|
| WO | 2017011601 A1 | 1/2017 |

OTHER PUBLICATIONS

International Search Report/Written Opinion issued in PCT/US2017/041643 dated Apr. 5, 2018.

(Continued)

*Primary Examiner* — Lynn D Feild
*Assistant Examiner* — Viral S Lakhia
(74) *Attorney, Agent, or Firm* — Patterson + Sheridan, LLP (57) ABSTRACT

Embodiments presented herein provide systems and methods for creating and modifying a hash chain. A hash chain is created to track resource-privilege transfers between entities. A root node of the hash chain identifies the resource and specifies a digest of a possession token held by a first entity that initially possesses the privilege. A transfer of the privilege to a second entity can be recorded by adding an expansion node to the hash chain. If the second entity successfully reveals a possession token that a hashing function associated with the hash chain maps to the digest, an expansion node is linked to the root node. The expansion node indicates the possession token and a successor digest that is based on a successor possession token.

20 Claims, 8 Drawing Sheets

(56) References Cited

U.S. PATENT DOCUMENTS

2019/0149338 A1* 5/2019 Byrne .................... G06F 21/64
2019/0182232 A1* 6/2019 Bowers ................ H04L 9/0662

OTHER PUBLICATIONS

Tim Swanson: "Consensus-as-a-service: a breif report on the emergence of permissioned, distributed ledger systems Contents", Apr. 6, 2016, XP055335960; www.weusecoins.com/assets/pdf/library/Consensus-as-a-service—a brief report on the emergence of permissioned distributed ledger.pdf [retrieved on Jan. 17, 2017] pp. 13,21.

* cited by examiner

SECURE TOKEN PASSING VIA HASH CHAINS

BACKGROUND

Field

Embodiments presented herein generally relate to systems for secure token passing via hash chains. More specifically, systems are disclosed for tracking and transferring a digital token in a secure way via a private or publicly visible hash chain.

Related Art

Electronic records provide many useful and convenient benefits in a variety of industries. For example, electronic records can be readily backed up in multiple repositories to ensure data is not lost in the event of a system failure. Electronic records can also be readily made available through computing networks for rapid access (e.g., for searching and data analysis).

While convenient and useful, some electronic records can also be altered or forged in ways that are difficult to detect. Electronic records that are accessible through networks may be particularly vulnerable to alteration (e.g., by hackers or malicious programs). To make electronic records more resistant to unauthorized modification, block chains, hash chains, and related approaches can be used. For example, in digital transaction-processing systems, block-chain transaction records are redundantly stored in many computing devices across a peer-to-peer network. If one copy of the block chain is compromised and altered, the alteration can be readily detected when the altered copy is compared to other copies in the peer network.

SUMMARY

One embodiment of the present disclosure includes a method for extending a hash chain. The method generally includes receiving a request to add an expansion node to a hash chain associated with a resource to signify a transfer of a privilege associated with the resource, wherein the request indicates a confirmation possession token; generating a confirmation hash digest based on the confirmation possession token via a hashing function associated with the hash chain; verifying the confirmation hash digest matches a predecessor hash digest indicated in a predecessor node of the hash chain, wherein the hashing function maps a predecessor possession token to the predecessor hash digest; and linking the expansion node to the predecessor node, wherein the expansion node indicates the predecessor possession token and a successor hash digest, wherein the successor hash digest is based on a successor possession token.

Another embodiment provides a computer-readable storage medium having instructions, which, when executed on a processor, perform an operation comprising: receiving a request to add an expansion node to a hash chain associated with a resource to signify a transfer of a privilege associated with the resource, wherein the request indicates a confirmation possession token; generating a confirmation hash digest based on the confirmation possession token via a hashing function associated with the hash chain; verifying the confirmation hash digest matches a predecessor hash digest indicated in a predecessor node of the hash chain, wherein the hashing function maps a predecessor possession token to the predecessor hash digest; and linking the expansion node to the predecessor node, wherein the expansion node indicates the predecessor possession token and a successor hash digest, wherein the successor hash digest is based on a successor possession token.

Still another embodiment of the present disclosure includes a processor and a memory storing a program which, when executed on the processor, performs an operation comprising: receiving a request to add an expansion node to a hash chain associated with a resource to signify a transfer of a privilege associated with the resource, wherein the request indicates a confirmation possession token; generating a confirmation hash digest based on the confirmation possession token via a hashing function associated with the hash chain; verifying the confirmation hash digest matches a predecessor hash digest indicated in a predecessor node of the hash chain, wherein the hashing function maps a predecessor possession token to the predecessor hash digest; and linking the expansion node to the predecessor node, wherein the expansion node indicates the predecessor possession token and a successor hash digest, wherein the successor hash digest is based on a successor possession token.

DETAILED DESCRIPTION

Embodiments presented herein provide systems and methods for creating and modifying a hash chain. A hash chain is created to track resource-privilege transfers between entities. A root node of the hash chain identifies the resource and specifies a digest of a possession token held by a first entity that initially possesses the privilege. A transfer of the privilege to a second entity can be recorded by adding an expansion node to the hash chain. If the second entity successfully reveals a possession token that a hashing function associated with the hash chain maps to the digest, an expansion node is linked to the root node. The expansion node indicates the possession token and a successor digest that is based on a successor possession token.

The hash chains described herein can be used, for example, to ensure that a single entity has privileges to control a network-connected resource at a time. For example, suppose an electronic document is stored in a cloud-based system accessible via a network. Also suppose several different engineers are supposed to proofread and revise the document. However, if the engineers review the same version of the document simultaneously, valuable time may be wasted because multiple engineers may take the time to correct a single error that could have been detected and corrected by a single engineer. In addition, different engineers may unknowingly make incompatible revisions within the document. A hash chain described herein can be used to track transfers of an editing privilege for the document (and the revisions made to the document by each person who has held the privilege, if desired). Using the hash chain, the engineers can ensure that only one person holds the privilege at a time so that time is not wasted making redundant changes.

The hash chains described herein can also be used, for example, to record a verifiable chain of title for something of value (e.g., real estate, automobiles, and other assets). If the chain of title for a home is recorded using a hash chain as described herein, potential buyers (or their representatives) can use the hash chain to verify that a would-be seller actually holds the title to the home. In this manner, hash chains described herein can thwart fraudulent attempts to transfer resources (e.g., fraudulent sales of the Brooklyn Bridge).

Figure 1:
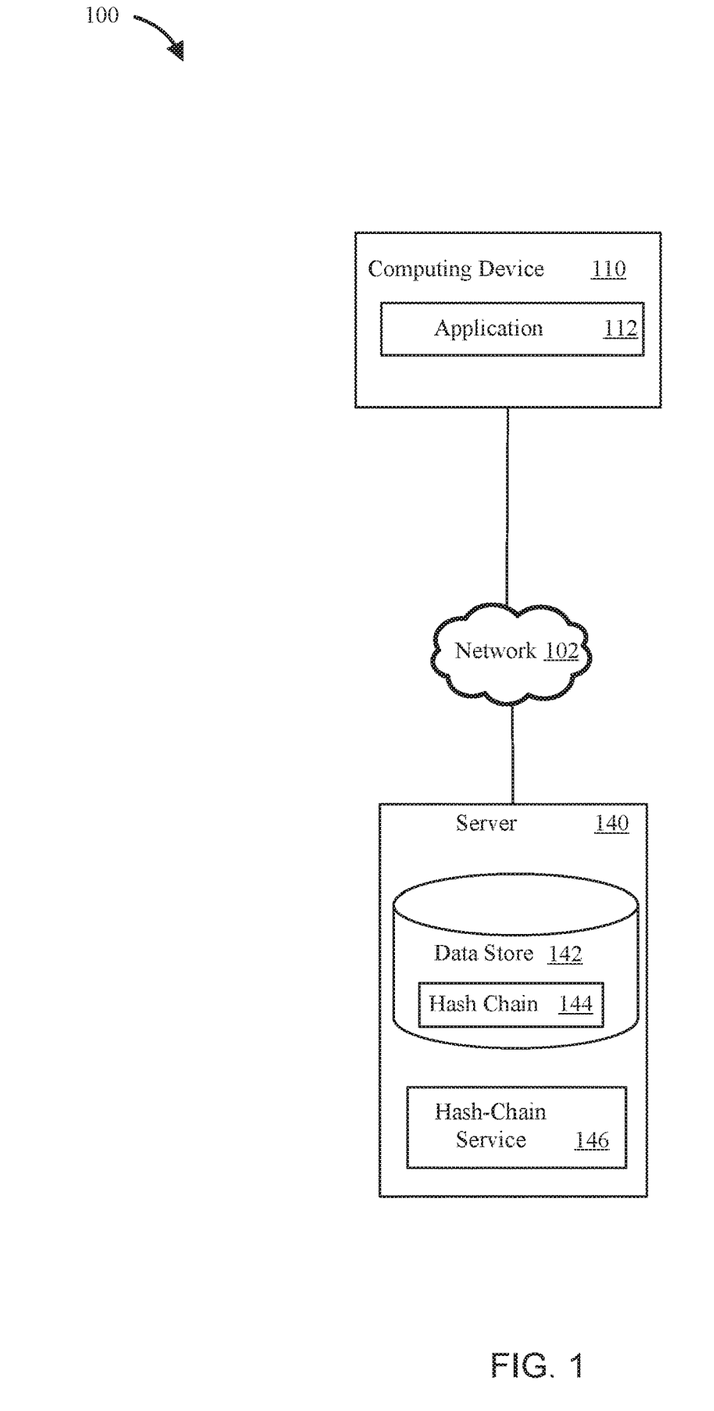
FIG. 1 illustrates a computing network environment that facilitates use of a hash chain, according to one embodiment.

FIG. 1 illustrates a computing network environment 100 in which a hash chain 144 is used to verify possession of a privilege, such as exclusive access rights or ownership rights, associated with a resource, according to one embodiment. As shown, the environment 100 includes a network 102, a server 140, and computing device 110.

The server 140 includes a hash-chain service 146 that manages access to the hash chain 144. The hash chain 144 is stored in the data store 142. The hash chain 144 is associated with a resource for which privileges (e.g., ownership, possession, use) are transferable between entities. For example, the resource may be physical (e.g., real estate, a computing device, an automobile, a license, or an appliance) or intangible (e.g., a computer program, an electronic document, a patent, a copyright, a trademark, a contractual right, a hunting tag, or an operating permit). These examples are provided for illustrative purposes only and are not exhaustive.

To create the hash chain 144, a first user (e.g., an individual or an organization) accesses the hash-chain service 146 via an application 112 (e.g., a browser or a dedicated application) executing on the computing device 110. Through the network 102, the user sends a request to create a hash chain for a particular resource. The request includes a resource-identifier token of the resource. For example, if the resource is an automobile, the root node can include the vehicle identification number (VIN) of the automobile. If the resource is a device, the root node can include the serial number of the device.

The first user also selects a possession token. The possession token is an arbitrary digital value (e.g., a password or key) that the first user does not publically divulge (except to a party to whom the first user wishes to transfer the privilege at a later time). The possession token is input into a one-way hashing function (e.g., a cryptographic hashing function such as SHA-256) to produce a digest of the possession token.

The hash-chain service 146 generates a root node for the hash chain 144. The root node includes the resource-identifier token and the digest of the possession token. In some embodiments, the root node can also include an identifier of the first user and additional data. Regardless of whether an identifier of the first user is included, the root node corresponds to the first user because the first user possesses the possession token corresponds to the digest (e.g., that can be mapped to the digest stored in the root node).

In this context, the term "node" refers to a data element in a data structure used to implement the hash chain 144. For example, if the hash chain 144 is implemented in an object-oriented programming language, the root node can be an instantiated object of a class and can store the resource-identifier token and the digest of the possession token as member variables or attributes. If the hash chain 144 is implemented in another type of programming language, nodes may be implemented using another type of data element (e.g., a STRUCT in C or a record in TurboPascal).

In one embodiment, once the root node has been generated, the hash-chain service 146 can make the hash chain 144 publicly visible over the network 102 to parties that wish to determine who currently holds the privilege to the resource. Alternatively, the hash-chain service 146 can keep the hash chain 144 private (e.g., by only allowing authorized users with certain permissions or credentials to have access).

The hash chain 144 is generally extended when the user or other entity that currently holds the privilege transfers the privilege to a successor user or other entity. First, the successor user obtains or otherwise becomes entitled to the privilege held by the current user. To enable recordation of the transfer of the privilege from the current user to the successor user, the current user divulges the possession token to the successor user. The successor user sends an electronic message to the hash-chain service 146 via the network 102 (e.g., via the application 112) requesting that a transfer of the privilege from the current user to the successor user be reflected in the hash chain 144. The electronic message includes the possession token to demonstrate that the successor user is legitimately entitled to receive the privilege from the current user.

Upon receiving the electronic message, the hash-chain service 146 generates an expansion node that corresponds to the successor user. The expansion node includes the possession token that the current user provided to the successor user (which may be referred to as the predecessor possession token, since it is the possession token associated with the node that precedes the expansion node in the hash chain). The successor user also selects another possession token, which may be referred to as the successor possession token. The successor user does not publically divulge the successor possession token. Rather, the successor possession token is input into the hashing function to produce a digest of the successor possession token. The digest of the successor possession token is included in the expansion node.

Depending on the embodiment, the expansion node may also include the resource-identifier token, an identifier of the successor user, and additional data. Regardless of whether an identifier of the successor user is included, the expansion node corresponds to the successor user in the sense that the second user has the successor possession token that the hashing function maps to the digest included in the expansion node.

Once the expansion node has been generated, the hash-chain service 146 links the expansion node to the predecessor node (e.g., the root node if the privilege has not been previously transferred). The manner of linking the expansion node to the root node may vary depending on the data structure used to implement the hash chain 144. For example, if the hash chain 144 is implemented as linked list, the expansion node may be linked to the predecessor node by setting a pointer (or reference) in the predecessor node or expansion node to a memory address where the expansion node or the predecessor node, respectively, is located in memory. In another example, the hash chain 144 may be implemented as an array (or vector) of references to objects (e.g., in an object-oriented programming language such as Java). The array (or vector) has a reference to the predecessor node at an index i (where i is an integer). The expansion node may be linked to the predecessor node by adding a reference to the expansion node to the array (or vector) at index i+1.

Subsequent expansion nodes can be added to the hash chain 144 in a similar manner each time the privilege is transferred from one user to another.

Figure 2:
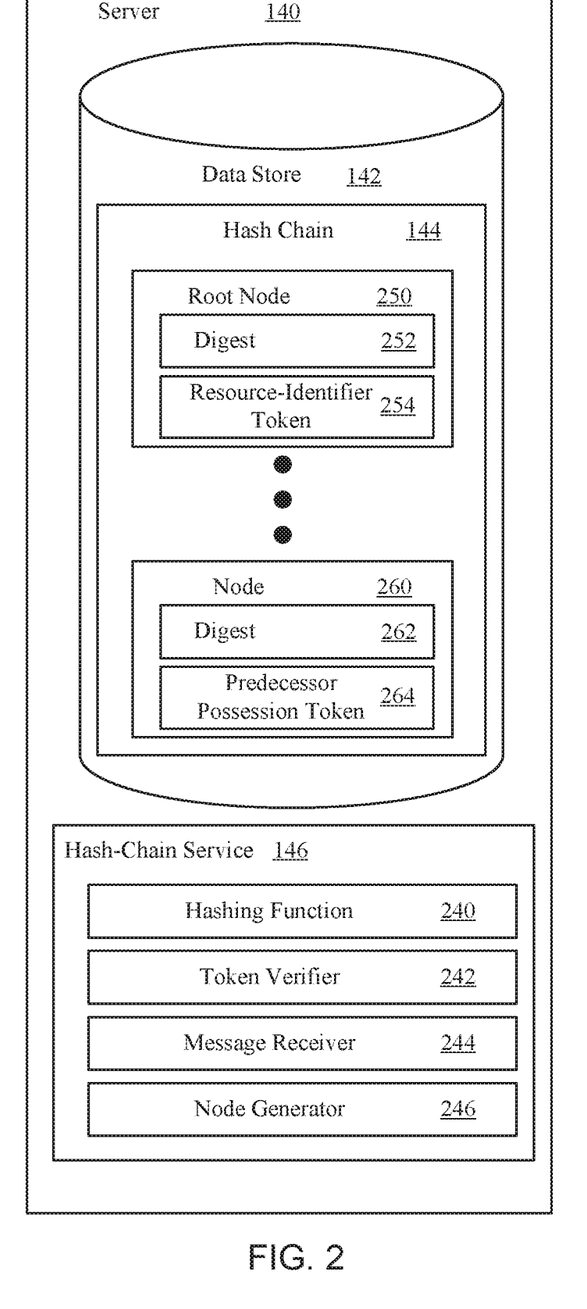
FIG. 2 illustrates a detailed view of a hash chain and a hash-chain service, according to one embodiment.

FIG. 2 illustrates a detailed view of the hash chain 144 and the hash-chain service 146, according to one embodiment. As shown, the hash-chain service 146 includes a hashing function 240, a token verifier 242, a message receiver 244, and a node generator 246.

When the message receiver 244 receives a request to create the hash chain 144 to track transfers of a privilege associated with a particular resource, the node generator 246 generates the root node 250. As shown, the root node 250 includes the resource-identifier token 254 and the digest 252 of a first possession token. The resource-identifier token 254 identifies the resource associated with the hash chain 144. The hashing function 240 maps the first possession token to the digest 252.

When the message receiver 244 receives a message indicating that the privilege has been transferred, the node generator 246 generates node 260. As shown, node 260 includes a predecessor possession token 264. If, for example, node 260 represents a legitimate transfer of the privilege and the root node 144 is the immediate predecessor of node 260 in the hash chain 144, the token verifier 242 can confirm the hashing function 240 maps the predecessor possession token 264 digest 252. Node 260 also includes a digest 262 of a successor possession token. The hashing function 240 maps the successor possession token to the digest 262.

Figure 3:
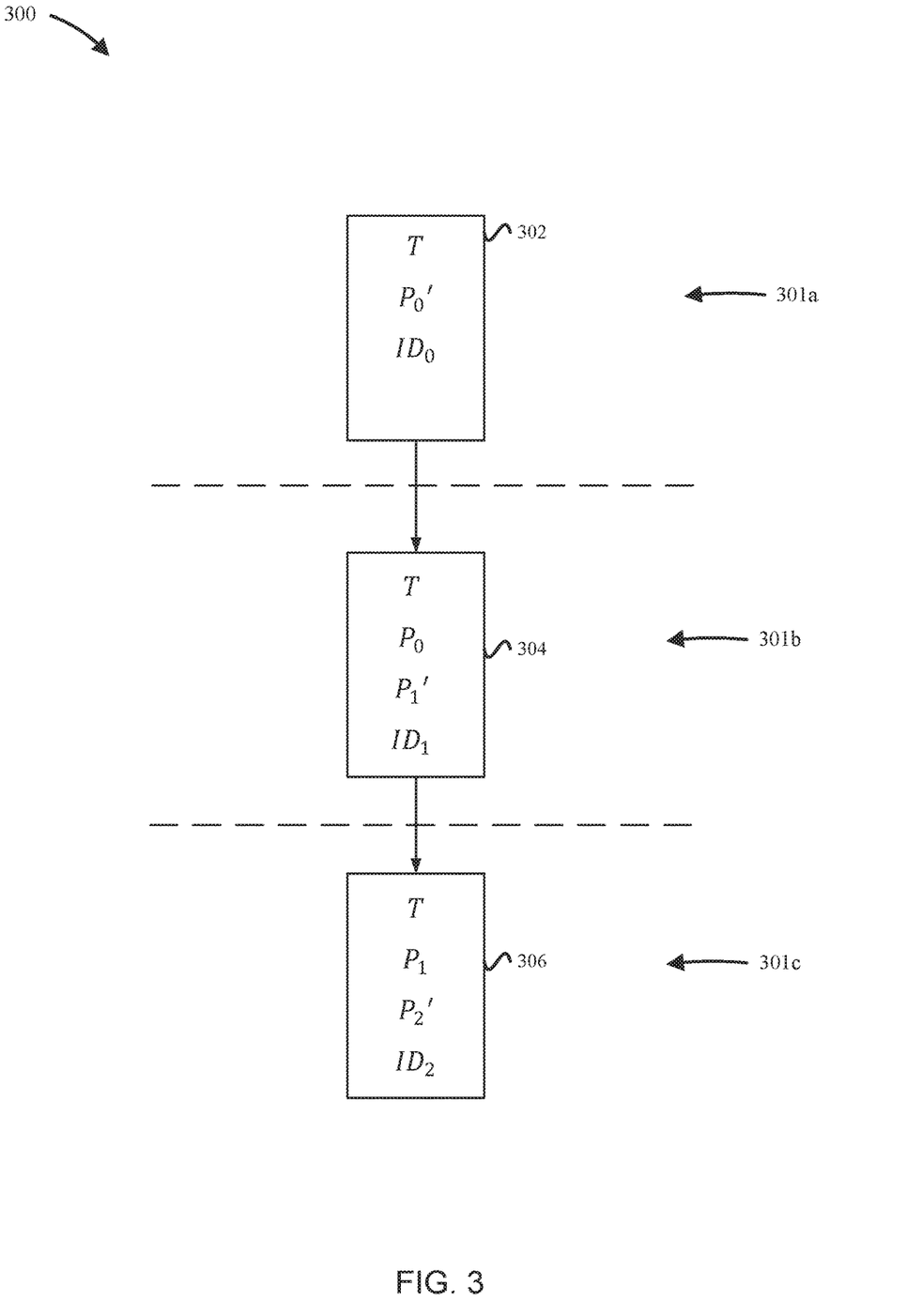
FIG. 3 illustrates a first example hash chain, according to one embodiment.

FIG. 3 illustrates a first example hash chain 300, according to one embodiment. Node 302 is the root node of the hash chain 300. As shown, node 302 is included in a first level 301a of the hash chain 300. The resource-identifier token T is a member data element of the node 302 that identifies a resource associated with the hash chain 300. The identifier $ID_0$ identifies a first entity that has a privilege associated with the resource. For example, if the resource is a vehicle and the resource-identifier token T is a VIN number, the identifier $ID_0$ may be the name of a person who owns the vehicle. The first hash digest $P_0'$ is a digest of a first possession token that is kept private by the first entity.

When a second entity wishes to receive the privilege associated with the resource from the first entity, the second entity obtains the first possession token from the first entity directly. For example, if the resource is a vehicle, the second entity can request the first possession token from the first entity upon purchasing the vehicle. The second entity sends an electronic message to a hash-chain service that maintains the hash chain 300 to request that a transfer of the privilege from the first entity to the second entity be reflected in the hash chain 300. The message includes the first possession token.

To document the transfer of the privilege from the first entity to the second entity, the hash-chain service links node 304 to the hash chain 300 at level 301b. The link may be implemented, for example, by setting a pointer that is a member element of the node 302 to a memory address of the node 304 or by setting a pointer that is a member element of the node 304 to a memory address of the node 302. The node 304 can include the resource-identifier token T and the identifier $ID_1$ (which identifies the second entity) as member elements. Furthermore, node 304 includes the first possession token $P_0$ and the second hash digest $P_1'$ as member elements. The second hash digest $P_1'$ is a digest of a second possession token that is kept private by the second entity.

In some embodiments, the hash-chain service that maintains the hash chain 300 verifies that a hashing function associated with the hash chain 300 maps the first possession token $P_0$ (as included in node 304) to the first hash digest $P_0'$ (as included in the node 302) before linking node 304 to node 302. In this manner, the hash chain service prevents successor nodes from being added by entities that have not obtained a possession token from an entity indicated in a predecessor node.

When a third entity wishes to receive the privilege associated with the resource, the third entity obtains the second possession token from the second entity directly. For example, if the resource is a vehicle, the third entity can request the second possession token from the second entity upon purchasing the vehicle. The third entity sends an electronic message to a hash-chain service that maintains the hash chain 300 to request that a transfer of the privilege from the second entity to the third entity be reflected in the hash chain 300. The message includes the second possession token.

To document the transfer of the privilege from the second entity to the third entity, the hash-chain service links node 306 to the hash chain 300 at level 301c. The link may be implemented, for example, by setting a pointer that is a member element of the node 304 to a memory address of the node 306 or by setting a pointer that is a member element of the node 306 to a memory address of the node 304. The node 306 can include the resource-identifier token T and the identifier $ID_2$ (which identifies the third entity) as member elements. Furthermore, node 306 includes the second possession token $P_1$ and the third hash digest $P_2'$ as member elements. The third hash digest $P_2'$ is a digest of a third possession token that is kept private by the third entity.

In some embodiments, the hashing function associated with the hash chain 300 may be publicly available. The third entity can independently verify that the hashing function maps the first possession token $P_0$ (as included in node 304) to the first hash digest $P_0'$ (as included in the node 302) using the hashing function. In this manner, the third entity can verify that the second entity legitimately has the privilege. (In some embodiments, a hash chain service performs the verification before adding node 304 to the hash chain 300.)

Figure 4:
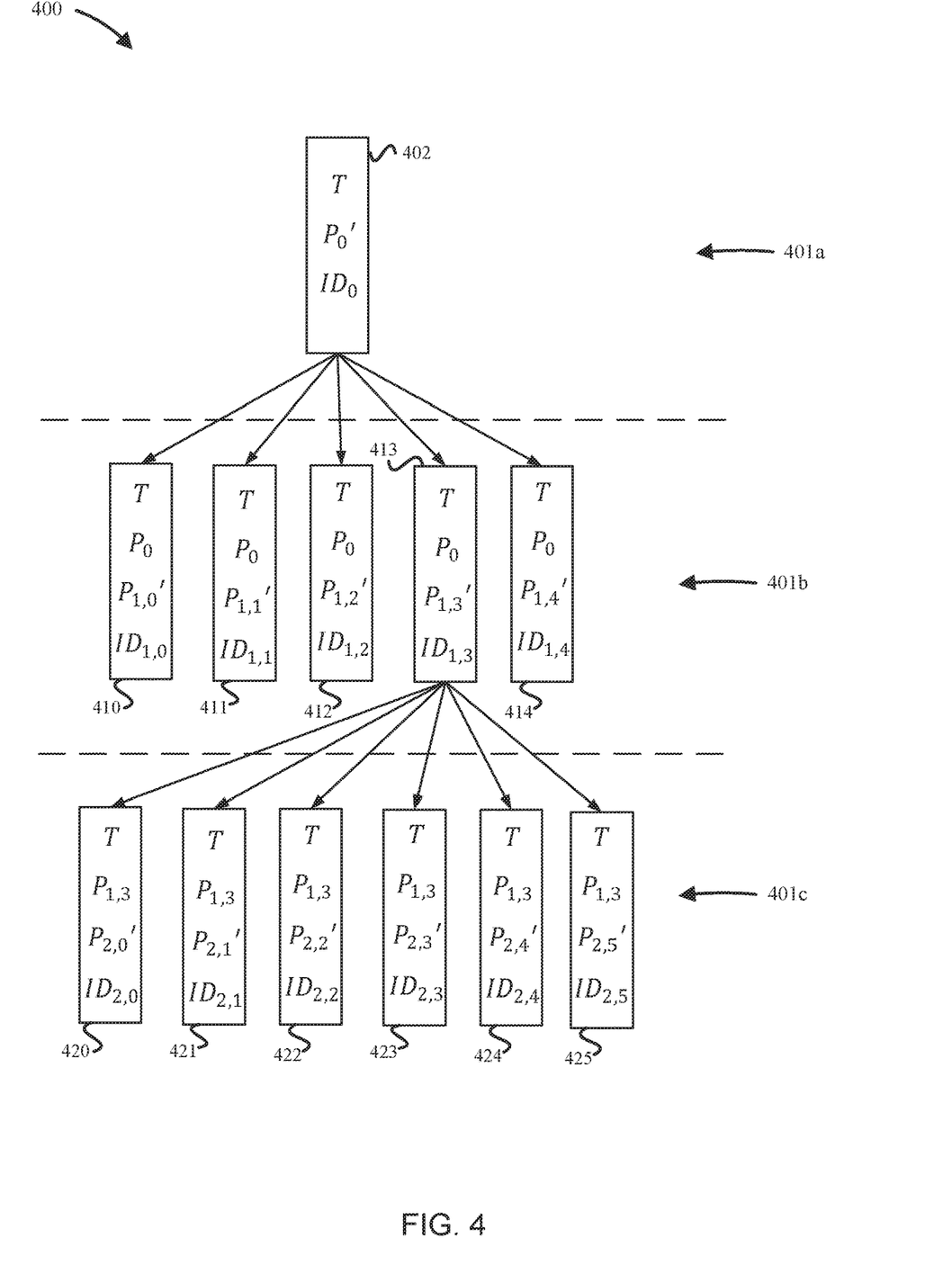
FIG. 4 illustrates a second example hash chain, according to one embodiment.

FIG. 4 illustrates a second example hash chain 400, according to one embodiment. Node 402 is the root node of the hash chain 400. As shown, node 402 is included in a first level 401a of the hash chain 400. The resource-identifier token T is a member data element of the node 402 that identifies a resource associated with the hash chain 400. The identifier $ID_0$ identifies a first entity that has a privilege associated with the resource. The first hash digest $P_0'$ is a digest of a first possession token that is kept private by the first entity.

Suppose five different entities wish to receive the privilege associated with the resource from the first entity. Each of the five entities obtains the first possession token from the first entity. Each of the five entities sends a respective electronic message to a hash-chain service that maintains the hash chain 400 to request that a transfer of the privilege from the first entity to the respective entity submitting the request be reflected in the hash chain 400. Each respective message includes the first possession token (e.g., to demonstrate privity with the first entity).

For each respective message, the hash-chain service adds a corresponding node to level 401b of the hash chain 400. Specifically, node 410, node 411, node 412, node 413, and node 414 are added. The hash-chain service links node 402 to nodes 410-414 to the hash chain 400 at level 401b. The links may be implemented, for example, by setting pointers that are member elements of the node 402 (e.g., as part of an array or a vector of pointers) to respective memory addresses of the nodes 410-414.

Each of the nodes 410-414 may include the resource-identifier token T as a member element. Furthermore, each of the nodes 410-414 may include an identifier of a corresponding entity as a member element. Specifically, node 410 includes identifier $ID_{1,0}$, node 411 includes identifier $ID_{1,1}$, node 412 includes identifier $ID_{1,2}$, node 413 includes identifier $ID_{1,3}$, and node 414 includes identifier $ID_{1,4}$. Furthermore, each of the nodes 410-414 includes the first possession token $P_0$ and an additional hash digest as member elements. Specifically, node 410 includes hash digest $P_{1,0}'$, node 411 includes hash digest $P_{1,1}'$, node 412 includes hash digest $P_{1,2}'$, node 413 includes hash digest $P_{1,3}'$, and node 414 includes hash digest $P_{1,4}'$. Each additional hash digest is a digest of an additional possession token that is kept private by the entity corresponding to the node that includes the additional hash digest.

In one embodiment, links (e.g., pointers) to the nodes 410-414 are arranged in an order that reflects when each respective electronic message was received. For example, suppose the entity corresponding to node 410 (i.e., the entity identified by identifier $ID_{1,0}$) sends the first electronic message requesting a transfer of the privilege that is received by the hash-chain service. A pointer to node 410 is positioned first in a list (e.g., array or vector) of pointers to the nodes 410-414. Similarly, suppose the entity corresponding to node 411 sends the second electronic message requesting a transfer of the privilege that is received by the hash-chain service. A pointer to node 411 is positioned second in the list of pointers to the nodes 410-414. In this manner, the position of a pointer in the list of pointers can reflect an order in which corresponding messages were received (e.g., as measured by timestamps associated with the messages). Alternatively, the nodes 410-414 can explicitly include the timestamps so that the order can be determined by sorting the nodes according to their timestamps.

In one embodiment, when multiple nodes are permitted in a single level of the hash chain 400, a predefined policy associated with the hash chain 400 designates a single node (or another subset of the multiple nodes) as the privilege-holder node(s) for that level of the hash chain 400. According to the policy, only the designated node (or nodes in the subset) signifies a legitimate transfer of privileges from a predecessor level of the hash chain 400. For example, in FIG. 4, the predefined policy designates the fourth node in level 401b of the hash chain 400 as the sole recipient of the transferred privilege in level 401b. Since node 413 is fourth in the order of nodes for level 401b, the entity indicated by identifier $ID_{1,3}$ is the recipient of the privilege.

After the nodes 410-414 have been added to the hash chain 400 at level 401b, suppose six additional entities wish to receive the privilege associated with the resource. Based on the predefined policy associated with the hash chain 400, the six additional entities are apprised that the entity indicated by identifier $ID_{1,3}$ holds the privilege. Each of the six additional entities obtains the possession token $P_{1,3}$ from the entity indicated by identifier $ID_{1,3}$. Each of the six additional entities sends a respective additional electronic message to the hash-chain service to request that a transfer of the privilege from the entity indicated by identifier $ID_{1,3}$ to the respective entity submitting the request be reflected in the hash chain 400. Each respective message includes the possession token $P_{1,3}$.

For each respective additional message, the hash-chain service adds a corresponding node to level 401c of the hash chain 400. Specifically, node 420, node 421, node 422, node 423, node 424, and node 425 are added. The hash-chain service links node 413 to nodes 420-425 to the hash chain 400 at level 401c. The links may be implemented, for example, by setting pointers that are member elements of the node 413 (e.g., as part of an array or a vector of pointers) to respective memory addresses of the nodes 420-425.

Each of the nodes 420-425 may include the resource-identifier token T as a member element. Furthermore, each of the nodes 420-425 may include an identifier of a corresponding entity as a member element. Specifically, node 420 includes identifier $ID_{2,0}$, node 421 includes identifier $ID_{2,1}$, node 422 includes identifier $ID_{2,2}$, node 423 includes identifier $ID_{2,3}$, and node 424 includes identifier $ID_{2,4}$. Furthermore, each of the nodes 420-425 includes the possession token $P_{1,3}$ and an additional hash digest as member elements. Specifically, node 420 includes hash digest $P_{2,0}'$, node 421 includes hash digest $P_{2,1}'$, node 422 includes hash digest $P_{2,2}'$, node 423 includes hash digest $P_{2,3}'$, node 424 includes hash digest $P_{2,4}'$, and node 425 includes hash digest $P_{2,5}'$. Each additional hash digest is a digest of an additional possession token that is kept private by the entity corresponding to the node that includes the additional hash digest.

In one embodiment, the links (e.g., pointers) to the nodes 420-425 are arranged in an order that reflects when each corresponding respective electronic message was received (e.g., as measured by timestamps associated with the messages). Based on the order of nodes 420-425, the predefined policy can designate the entity corresponding to node 423 (identified by identifier $ID_{2,3}$) as the recipient of the privilege in level 401c.

While the example predefined policy described in FIG. 4 designates that the entity corresponding to the fourth node in a level of the hash chain receives the transferred privilege, other policies can be used to designate which entity receives the privilege at each level. For example, a policy can designate that an entity corresponding to a node in the first, second, third, or $n^{th}$ (where n is a non-negative integer) position in an ordered level of a hash chain receives a transferred privilege. In some embodiments, the position can vary depending on the level. In one example, the position may vary as a function of the level number (e.g., position=level number (depth) modulus the number of nodes in the level, etc.). In another example, the policy may designate a random position at each level.

Figure 5:
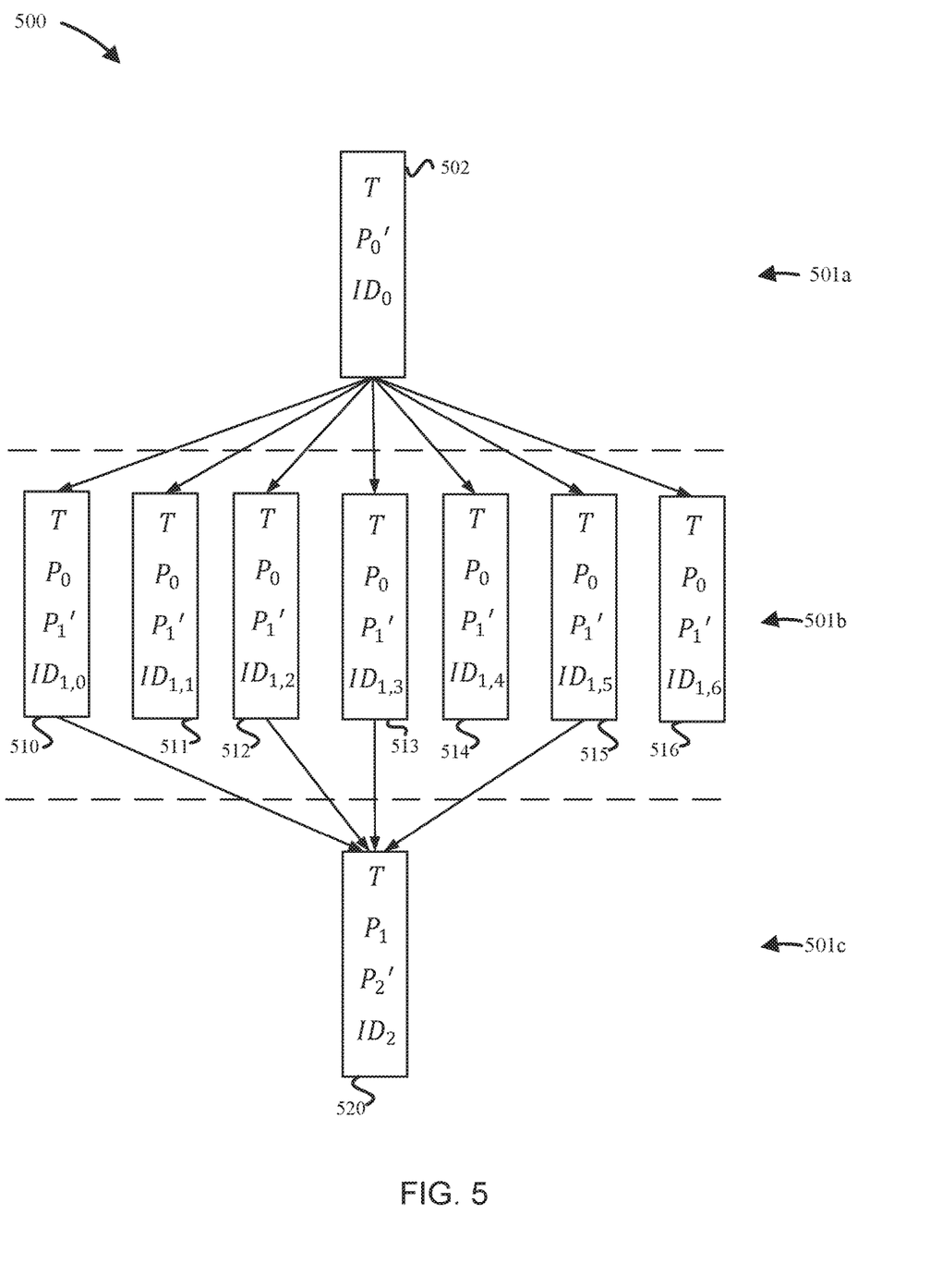
FIG. 5 illustrates a third example hash chain, according to one embodiment.

FIG. 5 illustrates a third example hash chain 500, according to one embodiment. Node 502 is the root node of the hash chain 500. As shown, node 502 is included in a first level 501a of the hash chain 500. The resource-identifier token T is a member data element of the node 502 that identifies a resource associated with the hash chain 500. The identifier $ID_0$ identifies a first entity that has a privilege associated with the resource. The first hash digest $P_0'$ is a digest of a first possession token that is kept private by the first entity.

Suppose seven entities are chosen to receive and jointly hold the privilege associated with the resource. To commence a transfer of the privilege from the first entity to the seven entities, the seven entities obtain the first possession token from the first entity. At least one electronic message sent to a hash-chain service that maintains the hash chain 500 requests that the privilege be transferred from the first entity to the seven entities and that the transfer be reflected in the hash chain 500.

For each of the seven entities, the hash-chain service adds a corresponding node to level 501b of the hash chain 500. Specifically, node 510, node 511, node 512, node 513, node 514, node 515, and node 516 are added to the hash chain 500 at level 501b. The hash-chain service links node 502 to nodes 510-516. The links may be implemented, for example, by setting pointers that are member elements of the node 502 (e.g., as part of an array or a vector of pointers) to respective memory addresses where the nodes 510-516 are stored.

Each of the nodes 510-516 may include the resource-identifier token T as a member element. Furthermore, each of the nodes 510-516 may include an identifier of a corresponding entity as a member element. Specifically, node 510 includes identifier $ID_{1,0}$, node 511 includes identifier $ID_{1,1}$, node 512 includes identifier $ID_{1,2}$, node 513 includes identifier $ID_{1,3}$, node 514 includes identifier $ID_{1,4}$, node 515 includes identifier $ID_{1,5}$, and node 516 includes identifier $ID_{1,6}$. Furthermore, each of the nodes 510-516 includes the first possession token $P_0$ and an additional hash digest $P_1'$ as member elements. The additional hash digest $P_1'$ is a digest of an additional possession token $P_1$.

However, none of the seven entities possesses the entire possession token $P_1$. Since none of the entities possesses the entire possession token, a segmentation scheme is used to generate a corresponding segment of the possession token $P_1$ for each of the seven entities. In one example segmentation scheme, each segment is a substring of the predecessor possession token $P_1$ and each segment overlaps with at least one other segment by a predefined number of characters. Each of the seven entities keeps one of the segments private.

Regardless of the segmentation scheme that is applied, the segments are generated in a manner such that the possession token $P_1$ can be reconstructed from a subset of the segments based on the segmentation scheme. For example, if the segments are overlapping substrings of the possession token $P_1$, the full possession token can be reconstructed by applying an assembly methodology (e.g., like the assembly methodologies used to assemble contiguous genes from overlapping DNA fragments).

After the nodes 510-516 have been added to the hash chain 500 at level 501b, suppose an additional entity wishes to receive the privilege associated with the resource. The additional entity obtains segments from four or the seven entities—specifically, the entities identified by identifiers $ID_{1,0}$, $ID_{1,2}$, $ID_{1,3}$, and $ID_{1,5}$. The additional entity sends an additional electronic message to the hash-chain service to request that a transfer of the privilege to the additional entity be reflected in the hash chain 500. The additional electronic message includes the obtained segments. (Alternatively, if the additional entity is apprised of the segmentation scheme, the additional entity can reconstruct the possession token $P_1$ from the obtained segments and include the possession token $P_1$ in the additional electronic message.)

Upon receiving the additional message, the hash-chain service reconstructs the possession token $P_1$ from the segments based on the segmentation scheme. Upon verifying that a hashing function associated with the hash chain 500 maps the possession token $P_1$ (as reconstructed) to the hash digest $P_1'$, the hash-chain service adds node 520 to the hash chain 500 at level 501c. Specifically, the hash-chain service links node 520 to node 510, node 512, node 513, and node 515 (which correspond to the entities whose corresponding segments were included in the additional electronic message). The linking may be accomplished, for example, by setting pointers that are member elements of node 510, node 512, node 513, and node 515 to a memory address of node 520.

Node 520 may include the resource-identifier token T as a member element. Furthermore, 520 may include an identifier of the additional entity as a member element. Specifically, node 520 includes identifier $ID_2$. Furthermore, node 520 includes the possession token $P_1$ and an additional hash digest $P_2'$ as member elements. The additional hash digest $P_2'$ is a digest of an additional possession token that is kept private by the additional entity.

Figure 6:
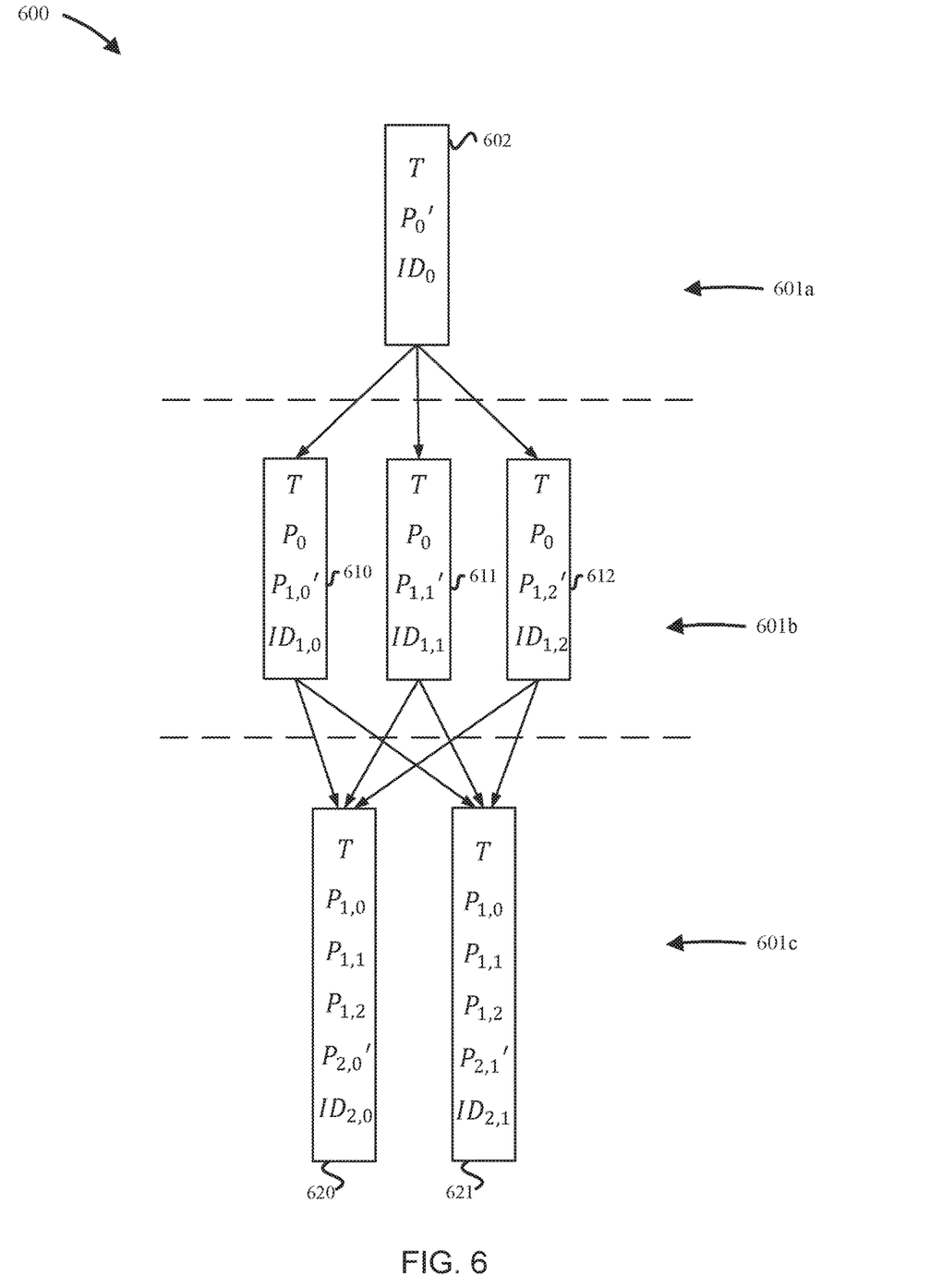
FIG. 6 illustrates a fourth example hash chain, according to one embodiment.

FIG. 6 illustrates a fourth example hash chain 600, according to one embodiment. Node 602 is the root node of the hash chain 600. As shown, node 602 is included in a first level 601a of the hash chain 600. The resource-identifier token T is a member data element of the node 602 that identifies a resource associated with the hash chain 600. The identifier $ID_0$ identifies a first entity that has a privilege associated with the resource. For example, if the resource is parcel of land and the resource-identifier token T is a lot/block number (or metes and bounds, etc.), the identifier $ID_0$ may be the name of a person who owns the parcel of land. The first hash digest $P_0'$ is a digest of a first possession token that is kept private by the first entity.

Suppose three different entities are jointly entitled to receive the privilege associated with the resource from the first entity. Each of the three entities obtains the first possession token from the first entity. For example, if the resource is a parcel of land, the three entities can obtain the first possession token from the first entity upon closing a sale of the parcel of land. Each of the three entities sends a respective electronic message to a hash-chain service that maintains the hash chain 600 to request that a transfer of the privilege from the first entity to the respective entity submitting the request be reflected in the hash chain 600. Each respective message includes the first possession token to demonstrate privity with the first entity.

For each respective message, the hash-chain service adds a corresponding node to level 601b of the hash chain 600. Specifically, node 610, node 611, and node 612 are added. The hash-chain service links node 602 to nodes 610-612. The links may be implemented, for example, by setting pointers that are member elements of the node 602 (e.g., as part of an array or a vector of pointers) to respective memory addresses of the nodes 610-612.

Each of the nodes 610-612 may include the resource-identifier token T as a member element. Furthermore, each of the nodes 610-612 may include an identifier of a corresponding entity as a member element. Specifically, node 610 includes identifier $ID_{1,0}$, node 611 includes identifier $ID_{1,1}$, and node 612 includes identifier $ID_{1,2}$. Furthermore, each of the nodes 610-612 includes the first possession token $P_0$ and an additional hash digest as member elements. Specifically, node 610 includes hash digest $P_{1,0}'$, node 611 includes hash digest $P_{1,1}'$, and node 612 includes hash digest $P_{1,2}'$. Each additional hash digest is a digest of an additional possession token that is kept private by the entity corresponding to the node that includes the additional hash digest.

After the nodes 610-612 have been added to the hash chain 600 at level 601b, suppose two additional entities wish to receive the privilege associated with the resource from the three entities that jointly possess the privilege. The two entities obtains the possession tokens $P_{1,0}$, $P_{1,1}$, and $P_{1,2}$ from the entities indicated by identifiers $ID_{1,0}$, $ID_{1,1}$, and $ID_{1,2}$, respectively. Each of the two additional entities sends a respective additional electronic message to the hash-chain service to request that a transfer of the privilege be reflected in the hash chain 600. Each respective message includes the possession tokens $P_{1,0}$, $P_{1,1}$, and $P_{1,2}$ to demonstrate privity with the three entities from whom the privilege is to be transferred.

For each respective additional message, the hash-chain service adds a corresponding node to level 601c of the hash chain 600. Specifically, node 620 and node 621 are added. The hash-chain service links nodes 610-612 to nodes 620-621. The links may be implemented, for example, by setting pointers that are member elements of nodes 610-612 (e.g., as part of an array or a vector of pointers) to respective memory addresses of nodes 620-621.

Each of the nodes 620-621 may include the resource-identifier token T as a member element. Furthermore, each of the nodes 620-621 may include an identifier of a corresponding entity as a member element. Specifically, node 620 includes identifier $ID_{2,0}$ and node 621 includes identifier $ID_{2,1}$. Furthermore, each of the nodes 620-621 includes possession tokens $P_{1,0}$, $P_{1,1}$ and $P_{1,2}$ and an additional hash digest as member elements. Specifically, node 620 includes hash digest $P_{2,0}'$ and node 621 includes hash digest $P_{2,1}'$. Each additional hash digest is a digest of an additional possession token that is kept private by the entity corresponding to the node that includes the additional hash digest.

While FIGS. 3-6 are illustrated as separate examples, the approaches illustrated in FIGS. 3-6 can also be combined. For example, a single hash chain may apply the approach described in FIG. 3 at one level and apply the approach of FIG. 4 at another level. Similarly, different approaches may be combined in a single level of a single hash chain.

Figure 7:
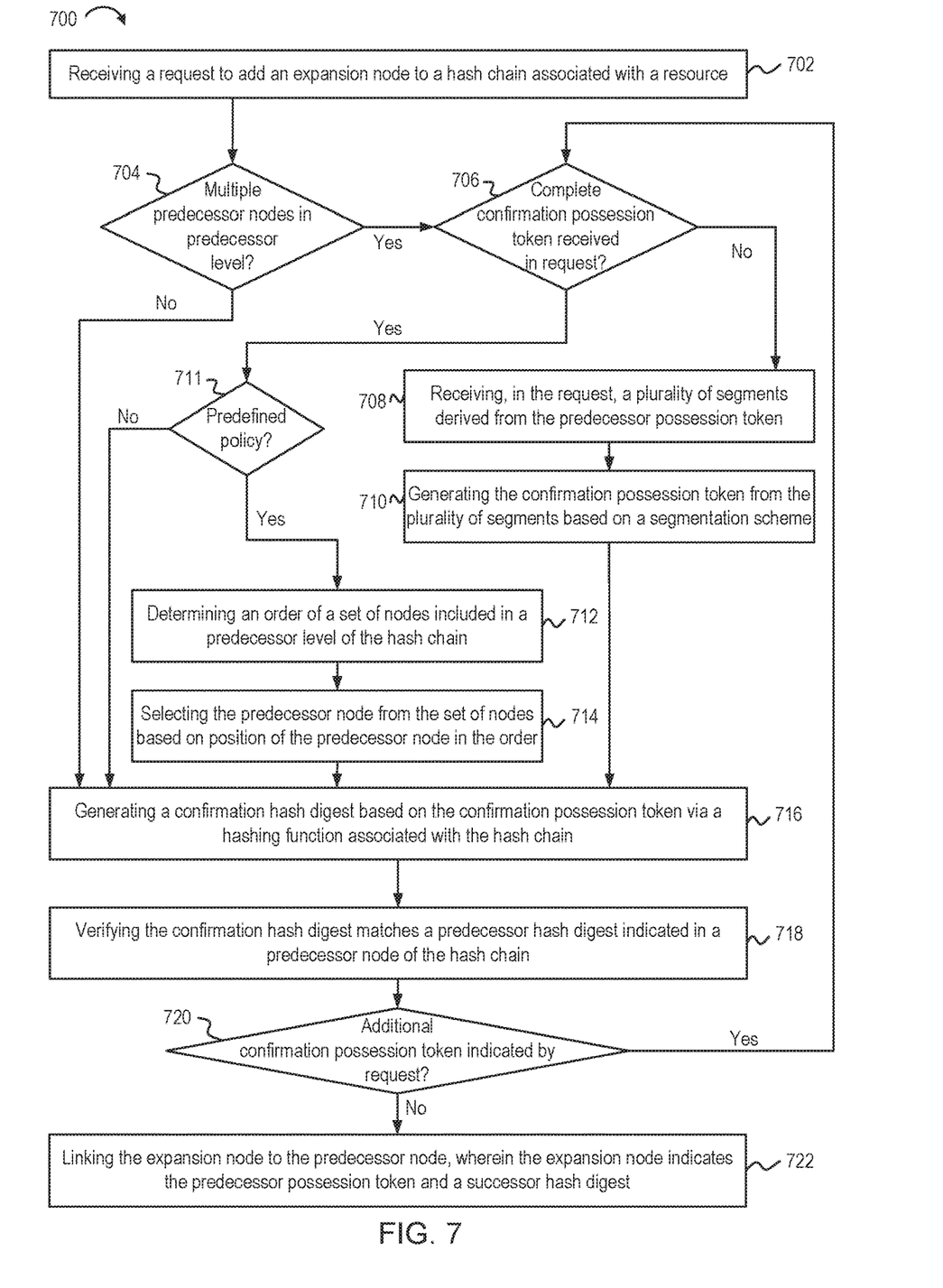
FIG. 7 illustrates example operations for a hash-chain system, according to one embodiment.

FIG. 7 illustrates example operations 700 for a hash-chain system, according to one embodiment. The operations 700 can be implemented as a method or the operations 700 can be executed as instructions on a machine (e.g., by one or more processors), where the instructions are included on at least one non-transitory computer-readable storage medium.

As illustrated in block 702, the operations 700 include receiving a request to add an expansion node to a hash chain associated with a resource. The request indicates a confirmation possession token. The confirmation token may be indicated in a variety of ways. In one straightforward example, the confirmation possession token is explicitly included in the request. In another example, the confirmation possession token is indicated indirectly (e.g., by a plurality of segments from which the confirmation possession token can be derived based on a segmentation scheme).

The resource associated with the hash chain may be any type of resource for which privileges (e.g., ownership, possession, use) are transferable between entities. For example, the resource may be physical (e.g., real estate, a computing device, an automobile, a license, or an appliance) or intangible (e.g., a computer program, an electronic document, a patent, a copyright, a trademark, a contractual right, a hunting tag, or an operating permit). These examples are provided for illustrative purposes only and are not exhaustive.

A root node of the hash chain may include a resource-identifier token that identifies the resource associated with the hash chain. For example, if the resource is an automobile, the root node can include the vehicle identification number (VIN) of the automobile. If the resource is real estate, the root node can include the address of the real estate along with any pertinent metes and bounds. If the resource is an appliance, the root node can include the serial number of the appliance.

The hash chain tracks when the privileges are transferred between entities. When the privileges are transferred from one entity to another, an expansion node is added to a successor level in the hash chain. The expansion node can identify the entity to which the privilege is transferred. A predecessor level immediately preceding the successor level in the hash chain includes at least one predecessor node. The predecessor node can identify the entity from which the privilege is transferred.

In some embodiments, the predecessor node includes an identifier of a first entity and the expansion node includes an identifier of a second entity. The expansion node, if added as requested, will indicate a transfer of the privileges from the first entity to the second entity.

In block 704, the operations 700 include determining whether there are multiple predecessor nodes in a predecessor level of the hash chain. If there is only one node in the predecessor level, the flow of operations 700 proceeds to block 716. Otherwise, the flow of operations 700 proceeds to block 706.

In block 706, the operations 700 include determining whether a complete confirmation possession token was received in the request. If a complete confirmation possession token was received, the flow of operations 700 proceeds to block 711. Otherwise, the flow of operations 700 proceeds to block 708.

In block 708, the operations 700 include receiving, in the request, a plurality of segments derived from the predecessor possession token based on a segmentation scheme. In one example segmentation scheme, each segment is a substring of the predecessor possession token and each segment overlaps with at least one other segment by a predefined number of characters. In another example segmentation scheme, segments are non-overlapping substrings and a corresponding index for each segment indicates where the segment is positioned in the predecessor possession token.

The segments are associated with a set of nodes in the predecessor level of the hash chain. For example, each node in the predecessor level may correspond to a predecessor entity that possesses one of the segments. The privileges for the resource associated with the hash chain may be jointly held by the predecessor entities that correspond to the predecessor nodes. In order for the privileges to be transferred, a successor entity may be obliged to obtain a plurality of segments from the predecessor entities and submit the segments in the request.

In block 710, the operations 700 include generating the confirmation possession token from the plurality of segments based on a segmentation scheme. For example, if the segments are overlapping substrings, the segments can be merged to generate the confirmation possession token. If the segments are non-overlapping and have corresponding indices, the confirmation possession token can be generated by inserting the segments at the positions indicated by the corresponding indices. If the request does not include enough segments for the confirmation possession token to be generated according to the scheme, the request to add an expansion node can be rejected.

In block 711, the operations 700 include determining whether there is a predefined policy associated with the hash chain that can be used to identify a specific predecessor node from amongst the multiple predecessor nodes (determined in block 704) in the predecessor level. If such a policy is associated with the hash chain, the flow of operations 700 proceeds to block 712. Otherwise, the flow of operations 700 proceeds to block 716.

In examples where such a predefined policy is associated with the hash chain, the predecessor node identified by the policy indicates a predecessor hash digest. A one-way hashing function (e.g., a cryptographic hashing function) associated with the hash chain maps a predecessor possession token to the predecessor hash digest. Unlike the predecessor hash digest, the predecessor possession token is not yet exposed in the hash chain. Rather, a predecessor entity associated with the predecessor node keeps the predecessor possession token private. If the request to add an expansion node is legitimate, the hashing function will map the confirmation possession token and the predecessor possession token to the same digest (as explained in further detail with respect to blocks 716 and 718).

In block 712, the operations 700 include determining an order of a set of nodes included in a predecessor level of the hash chain. Typically, the set of nodes includes the multiple nodes identified in block 704. In one example, the nodes in the set are ordered according to corresponding timestamps. The timestamp corresponding to a node indicates when a request to add the node to the hash chain was received.

In block 714, the operations 700 include selecting the predecessor node from the set of nodes included in the predecessor level based on a position of the predecessor node in the order and based a predefined policy. Specifically, in one embodiment, the predefined policy dictates that the predecessor node in the $n^{th}$ position (where n is a non-negative integer) of the order includes the predecessor hash digest to which a digest based on the confirmation possession token will be compared. (To avoid confusion, note that n is an index of a position of a node in the set of nodes in the predecessor level, not an indication of the depth of the predecessor level in the hash chain).

In block 716, the operations 700 include generating a confirmation hash digest based on the confirmation possession token via the hashing function associated with the hash chain. The confirmation hash digest is the output of the hashing function when the confirmation possession token is input into the hashing function. In other words, the confirmation possession token and the confirmation hash digest may be considered a key-value pair.

In block 718, the operations 700 include verifying the confirmation hash digest matches the predecessor hash digest indicated in the predecessor node of the hash chain. The hashing function maps the predecessor possession token to the predecessor hash digest. If the confirmation hash digest matches the predecessor hash digest, the operations 700 proceed to block 720.

In block 720, the operations 700 include determining whether any additional confirmation possession tokens are indicated in the request. In some embodiments, there may be an additional predecessor node in the predecessor level of the hash chain that is associated with an additional predecessor entity that has a share of the privileges sought to be transferred by the request. In such embodiments, the request includes an additional predecessor possession token and the flow of operations 700 returns to block 706.

In block 722, the operations 700 include linking the expansion node to the predecessor node. The expansion node indicates the predecessor possession token and a successor hash digest. The successor hash digest is based on a successor possession token (e.g., the successor hash digest is the output of the hash function when the successor possession token is used as input). In some embodiments where multiple predecessor entities had shares of the privileges that are transferred by the addition of the expansion node, the expansion node may be linked to multiple predecessor nodes in the predecessor level.

The manner of linking the expansion node to the predecessor node may vary depending on the data structure used to implement the hash chain. For example, if the hash chain is implemented as singly linked list, the expansion node may be linked to the predecessor node by setting a pointer (or reference) in the predecessor node to a memory address where the expansion node is located in memory. If the hash chain is a doubly linked list, a pointer in the expansion node can also be set to a memory address where the predecessor node is located in memory. If there are multiple predecessor nodes, the expansion node can include an array (or other structure) of pointers to the predecessor nodes.

Figure 8:
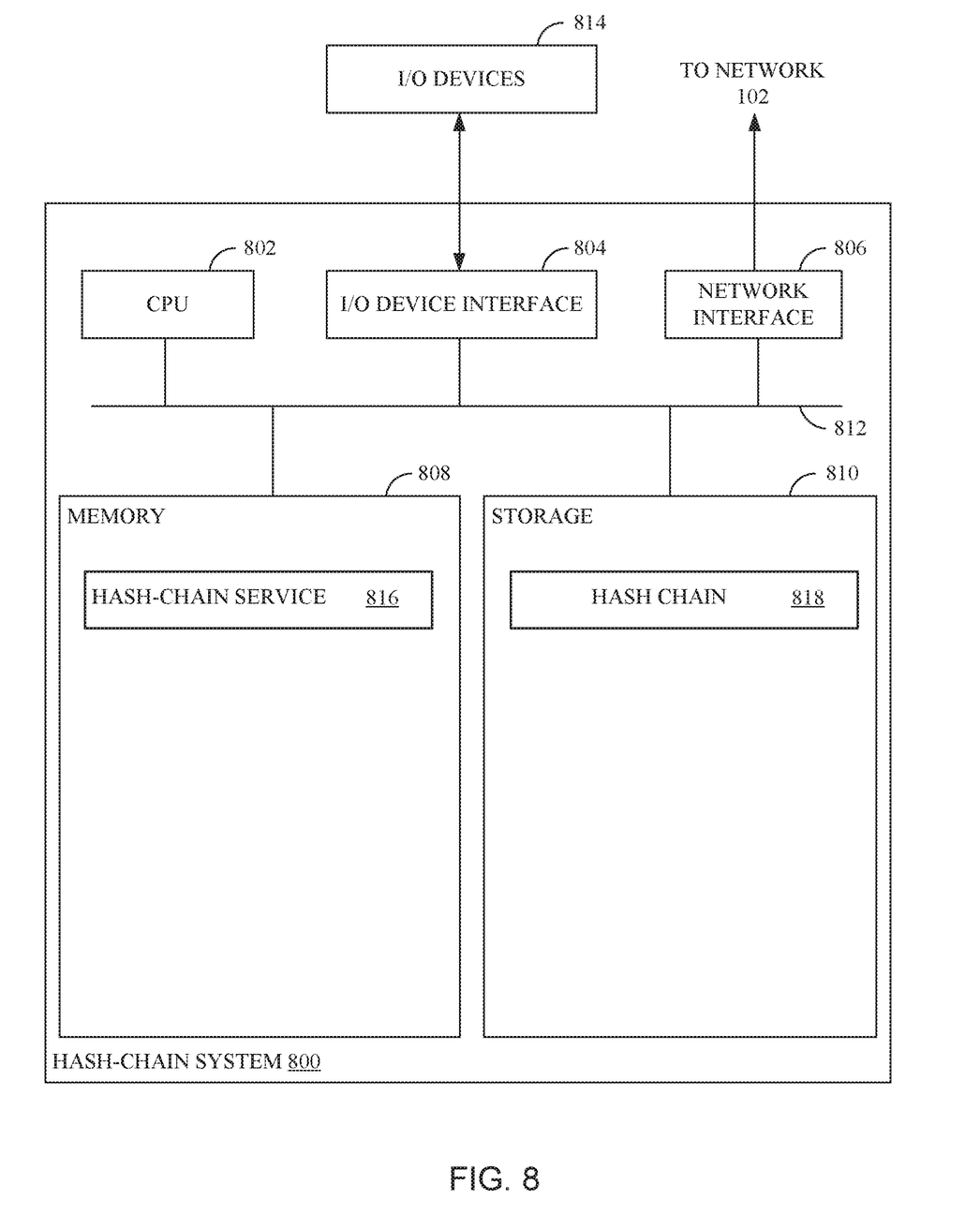
FIG. 8 illustrates a hash-chain system, according to an embodiment.

FIG. 8 illustrates a hash-chain system 800, according to an embodiment. As shown, the hash-chain system 800 includes, without limitation, a central processing unit (CPU) 802, at least one I/O device interface 804 which may allow for the connection of various I/O devices 814 (e.g., keyboards, displays, mouse devices, pen input, speakers, microphones, motion sensors, etc.) to the hash-chain system 800, network interface 806, a memory 808, storage 810, and an interconnect 812.

CPU 802 may retrieve and execute programming instructions stored in the memory 808. Similarly, the CPU 802 may retrieve and store application data residing in the memory 808. The interconnect 812 transmits programming instructions and application data, among the CPU 802, I/O device interface 804, network interface 806, memory 808, and storage 810. CPU 802 can represent a single CPU, multiple CPUs, a single CPU having multiple processing cores, and the like. Additionally, the memory 808 represents random access memory. Furthermore, the storage 810 may be a disk drive. Although shown as a single unit, the storage 810 may be a combination of fixed or removable storage devices, such as fixed disc drives, removable memory cards or optical storage, network attached storage (NAS), or a storage area-network (SAN).

As shown, memory 808 includes hash-chain service 816 and storage 810 includes a hash chain 818.

The hash chain 818 is associated with a resource for which privileges (e.g., ownership, possession, use) are transferable between entities. To create the hash chain 818, a first user, the user sends a request to create the hash chain 818 for the resource. The request includes a resource-identifier token of the resource.

The first user also selects a possession token. The possession token is an arbitrary digital value that the first user keeps secret. The possession token is input into a one-way hashing function to produce a digest of the possession token. The hash-chain service 816 generates a root node for the hash chain 818. The root node includes the resource-identifier token and the digest of the possession token. The root node corresponds to the first user in the sense that the first user has the possession token that the hashing function maps to the digest of the possession token.

Once the root node has been generated, the hash-chain service 816 can make the hash chain 818 publicly visible to parties that wish to determine who currently holds the privilege to the resource. Alternatively, the hash-chain service 146 can keep the hash chain 818 private (e.g., by only allowing authorized users with certain permissions or credentials to have access).

The hash chain 818 can be extended when the first user transfers the privilege to a second user in the following manner. First, suppose the second user purchases (or otherwise becomes entitled to) the privilege held by the first user. To enable the privilege to be transferred, the first user divulges the possession token to the second user. The second user sends an electronic message to the hash-chain service 816 requesting that a transfer of the privilege from the first user to the second user be reflected in the hash chain 818. The electronic message includes the possession token to demonstrate that the second user is legitimately entitled to receive the privilege from the first user.

Upon receiving the electronic message, the hash-chain service 816 generates an expansion node that corresponds to the second user. The expansion node includes the possession token that the first user provided to the second user (which may be referred to as the predecessor possession token, since it is the possession token associated with the node that precedes the expansion node in the hash chain). The second user also selects another possession token, which may be referred to as the successor possession token. The second user does not publically divulge the successor possession token. Rather, the successor possession token is input into the hashing function to produce a digest of the successor possession token. The digest of the successor possession token is included in the expansion node. The expansion node corresponds to the second user in the sense that the second user has the successor possession token that the hashing function maps to the digest included in the expansion node.

Once the expansion node has been generated, the hash-chain service 816 links the expansion node to the root node. The manner of linking the expansion node to the root node may vary depending on the data structure used to implement the hash chain 144. For example, if the hash chain 144 is implemented as linked list, the expansion node may be linked to the root node by setting a pointer (or reference) in the root node or expansion node to a memory address where the expansion node or the root node, respectively, is located in memory. Subsequent expansion nodes can be added to the hash chain 818 in a similar manner each time the privilege is transferred from one user to another.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A method comprising:
    receiving a request to add an expansion node to a hash chain associated with a resource, wherein:
        the expansion node signifies a transfer of a privilege associated with the resource from a first entity to a second entity,
        the request includes a confirmation possession token of the first entity,
        the first entity comprises one of a set of entities, and
        the second entity comprises a plurality of entities;
    generating a confirmation hash digest based on the confirmation possession token via a hashing function associated with the hash chain;
    verifying the confirmation hash digest matches a predecessor hash digest indicated in a predecessor node of the hash chain, wherein the hashing function maps a predecessor possession token to the predecessor hash digest; and
    linking the expansion node to the predecessor node, wherein the expansion node indicates the predecessor possession token and a successor hash digest, wherein the successor hash digest is based on a successor possession token.

2. The method of claim 1, wherein the predecessor node includes an identifier of the first entity and the expansion node includes an identifier of the second entity.

3. The method of claim 1, further comprising:
    determining an order of a set of nodes included in a predecessor level of the hash chain, wherein the set of nodes includes the predecessor node; and
    selecting the predecessor node from the set of nodes based on a position of the predecessor node in the order and a predefined policy.

4. The method of claim 1, further comprising:
receiving a plurality of requests to add additional nodes to the hash chain, wherein each request indicates a corresponding confirmation possession token;
generating, for each additional node, a corresponding hash digest based on the corresponding confirmation possession token;
verifying each corresponding hash digest matches the predecessor hash digest; and
linking each respective additional node to the predecessor node, wherein each additional node indicates the predecessor possession token and an additional hash digest based on an additional possession token associated with the respective additional node.

5. The method of claim 1, further comprising:
receiving, in the request, a plurality of segments derived from the predecessor possession token, wherein the segments are associated with a set of nodes in a predecessor level of the hash chain, and wherein the set of nodes includes the predecessor node;
generating the confirmation possession token from the plurality of segments based on a segmentation scheme; and
generating the confirmation hash digest by inputting the confirmation possession token into the hashing function associated with the hash chain.

6. The method of claim 1, further comprising:
receiving, in the request, a second confirmation possession token;
generating a second confirmation hash digest based on the second confirmation possession token via the hashing function;
verifying the second confirmation hash digest matches a second predecessor hash digest indicated in a second predecessor node of the hash chain, wherein the hashing function maps a second predecessor possession token to the second predecessor hash digest; and
linking the expansion node to the second predecessor node, wherein the expansion node indicates the second predecessor possession token.

7. The method of claim 1, wherein a root node of the hash chain includes a resource-identifier token that identifies the resource associated with the hash chain.

8. A system comprising:
one or more processors; and
memory storing one or more applications that, when executed on the one or more processors, perform an operation comprising:
receiving a request to add an expansion node to a hash chain associated with a resource, wherein:
the request signifies a transfer of a privilege associated with the resource from a first entity to a second entity,
the request includes a confirmation possession token of the first entity,
the first entity comprises one of a set of entities, and the second entity comprises a plurality of entities
generating a confirmation hash digest based on the confirmation possession token via a hashing function associated with the hash chain,
verifying the confirmation hash digest matches a predecessor hash digest indicated in a predecessor node of the hash chain, wherein the hashing function maps a predecessor possession token to the predecessor hash digest, and
linking the expansion node to the predecessor node, wherein the expansion node indicates the predecessor possession token and a successor hash digest, wherein the successor hash digest is based on a successor possession token.

9. The system of claim 8, wherein the predecessor node includes an identifier of the first entity and the expansion node includes an identifier of the second entity.

10. The system of claim 8, wherein the operation further comprises:
determining an order of a set of nodes included in a predecessor level of the hash chain, wherein the set of nodes includes the predecessor node; and
selecting the predecessor node from the set of nodes based on a position of the predecessor node in the order and a predefined policy.

11. The system of claim 8, wherein the operation further comprises:
receiving a plurality of requests to add additional nodes to the hash chain, wherein each request indicates a corresponding confirmation possession token;
generating, for each additional node, a corresponding hash digest based on the corresponding confirmation possession token;
verifying each corresponding hash digest matches the predecessor hash digest; and
linking each respective additional node to the predecessor node, wherein each additional node indicates the predecessor possession token and an additional hash digest based on an additional possession token associated with the respective additional node.

12. The system of claim 8, wherein the operation further comprises:
receiving, in the request, a plurality of segments derived from the predecessor possession token, wherein the segments are associated with a set of nodes in a predecessor level of the hash chain, and wherein the set of nodes includes the predecessor node;
generating the confirmation possession token from the plurality of segments based on a segmentation scheme; and
generating the confirmation hash digest by inputting the confirmation possession token into the hashing function associated with the hash chain.

13. The system of claim 8, wherein the operation further comprises:
receiving, in the request, a second confirmation possession token;
generating a second confirmation hash digest based on the second confirmation possession token via the hashing function;
verifying the second confirmation hash digest matches a second predecessor hash digest indicated in a second predecessor node of the hash chain, wherein the hashing function maps a second predecessor possession token to the second predecessor hash digest; and
linking the expansion node to the second predecessor node, wherein the expansion node indicates the second predecessor possession token.

14. The system of claim 8, wherein a root node of the hash chain includes a resource-identifier token that identifies the resource associated with the hash chain.

15. A non-transitory computer-readable storage medium containing instructions that, when executed by one or more processors, perform an operation comprising:
> receiving a request to add an expansion node to a hash chain associated with a resource, wherein:
> > the request signifies a transfer of a privilege associated with the resource from a first entity to a second entity,
> > the request includes a confirmation possession token of the first entity,
> > the first entity comprises one of a set of entities, and
> > the second entity comprises a plurality of entities;
> generating a confirmation hash digest based on the confirmation possession token via a hashing function associated with the hash chain;
> verifying the confirmation hash digest matches a predecessor hash digest indicated in a predecessor node of the hash chain, wherein the hashing function maps a predecessor possession token to the predecessor hash digest; and
> linking the expansion node to the predecessor node, wherein the expansion node indicates the predecessor possession token and a successor hash digest, wherein the successor hash digest is based on a successor possession token.

16. The non-transitory computer-readable storage medium of claim 15, wherein the predecessor node includes an identifier of the first entity and the expansion node includes an identifier of the second entity.

17. The non-transitory computer-readable storage medium of claim 15, wherein the operation further comprises:
> determining an order of a set of nodes included in a predecessor level of the hash chain, wherein the set of nodes includes the predecessor node; and
> selecting the predecessor node from the set of nodes based on a position of the predecessor node in the order and a predefined policy.

18. The non-transitory computer-readable storage medium of claim 15, wherein the operation further comprises:
> receiving a plurality of requests to add additional nodes to the hash chain, wherein each request indicates a corresponding confirmation possession token;
> generating, for each additional node, a corresponding hash digest based on the corresponding confirmation possession token;
> verifying each corresponding hash digest matches the predecessor hash digest; and
> linking each respective additional node to the predecessor node, wherein each additional node indicates the predecessor possession token and an additional hash digest based on an additional possession token associated with the respective additional node.

19. The non-transitory computer-readable storage medium of claim 15, wherein the operation further comprises:
> receiving, in the request, a plurality of segments derived from the predecessor possession token, wherein the segments are associated with a set of nodes in a predecessor level of the hash chain, and wherein the set of nodes includes the predecessor node;
> generating the confirmation possession token from the plurality of segments based on a segmentation scheme; and
> generating the confirmation hash digest by inputting the confirmation possession token into the hashing function associated with the hash chain.

20. The non-transitory computer-readable storage medium of claim 15, wherein the operation further comprises:
> receiving, in the request, a second confirmation possession token;
> generating a second confirmation hash digest based on the second confirmation possession token via the hashing function;
> verifying the second confirmation hash digest matches a second predecessor hash digest indicated in a second predecessor node of the hash chain, wherein the hashing function maps a second predecessor possession token to the second predecessor hash digest; and
> linking the expansion node to the second predecessor node, wherein the expansion node indicates the second predecessor possession token.

* * * * *